United States Patent
Agarwal et al.

(10) Patent No.: US 10,095,779 B2
(45) Date of Patent: Oct. 9, 2018

(54) STRUCTURED REPRESENTATION AND CLASSIFICATION OF NOISY AND UNSTRUCTURED TICKETS IN SERVICE DELIVERY

(71) Applicant: International Business Machines Corporation, Armonk, NY (US)

(72) Inventors: Shivali Agarwal, Bangalore (IN); Arjun R. Akula, Hyderabad (IN); Gaargi B. Dasgupta, Bangalore (IN); Shripad J. Nadgowda, Nagpur (IN); Tapan K. Nayak, New Delhi (IN)

(73) Assignee: International Business Machines Corporation, Armonk, NY (US)

( * ) Notice: Subject to any disclaimer, the term of this patent is extended or adjusted under 35 U.S.C. 154(b) by 783 days.

(21) Appl. No.: 14/733,415

(22) Filed: Jun. 8, 2015

(65) Prior Publication Data
US 2016/0357859 A1 Dec. 8, 2016

(51) Int. Cl.
*G06F 17/30* (2006.01)
*G06F 7/00* (2006.01)
(Continued)

(52) U.S. Cl.
CPC ...... *G06F 17/30705* (2013.01); *G06F 17/271* (2013.01); *G06F 17/2765* (2013.01);
(Continued)

(58) Field of Classification Search
CPC ......... G06F 17/30705; G06F 17/30684; G06F 17/271; G06F 17/2765; G06N 99/005; G06N 7/005
(Continued)

(56) References Cited

U.S. PATENT DOCUMENTS 7,302,383 B2 * 11/2007 Valles .................. G06F 17/271
704/231
8,527,811 B2 9/2013 Gilbert et al.
(Continued)

OTHER PUBLICATIONS

Lopresti, Optical Character Recognition Errors and Their Effects on Natural Language Processing, International Journal on Document Analysis and Recognition (IJDAR), vol. 12, No. 3, pp. 141-151, 2009.
(Continued)

*Primary Examiner* — Kuen S Lu
(74) *Attorney, Agent, or Firm* — Ryan, Mason & Lewis, LLP

(57) ABSTRACT

Methods, systems, and computer program products for structured representation and classification of noisy and unstructured tickets are provided herein. A method includes correlating one or more items of problem incident text data from a given problem incident identifier with items of event text data to generate items of correlated text data within the given problem incident identifier; applying a syntactic grammar to the items of correlated text data to identify in the given problem incident identifier (i) one or more domain-dependent concepts and (ii) one or more domain-independent concepts; parsing noisy and/or unstructured text from the given problem incident identifier based on analysis of (i) the domain-dependent concepts and (ii) the domain-independent concepts; and classifying the given problem incident identifier by classifying features derived from text of the given problem incident identifier subsequent to said parsing of said noisy and/or unstructured text from the given problem incident identifier.

20 Claims, 7 Drawing Sheets

(51) Int. Cl.
*G06N 99/00* (2010.01)
*G06N 7/00* (2006.01)
*G06F 17/27* (2006.01)

(52) U.S. Cl.
CPC ....... *G06F 17/30684* (2013.01); *G06N 7/005* (2013.01); *G06N 99/005* (2013.01)

(58) Field of Classification Search
USPC ........................................................ 707/737
See application file for complete search history.

(56) References Cited

U.S. PATENT DOCUMENTS

| | | | |
|---|---|---|---|
| 8,655,803 B2 | 2/2014 | Lecerf et al. | |
| 2007/0260564 A1* | 11/2007 | Peters | G06F 17/27 706/14 |
| 2008/0062885 A1* | 3/2008 | Moon | H04L 41/16 370/244 |
| 2009/0070103 A1* | 3/2009 | Beggelman | G06F 17/27 704/9 |
| 2009/0164387 A1* | 6/2009 | Armstrong | G06F 17/241 705/36 R |
| 2009/0281791 A1 | 11/2009 | Li | |
| 2014/0365207 A1* | 12/2014 | Convertino | G06F 17/2785 704/9 |
| 2015/0382079 A1* | 12/2015 | Lister | H04N 21/8456 725/38 |

OTHER PUBLICATIONS

Agarwal et al. SmartDispatch: Enabling Efficient Ticket Dispatch in an IT Service Environgment, Proceedings of the 18th ACM SIGKDD International Conference on Knowledge Discovery and Data Mining, pp. 1393-1401, 2012.

Wong et al. Enhanced Integrated Scoring for Cleaning Dirty Texts, 2008, pp. 1-9.

Gupta et al. A Novel Approach Towards Building a Portable NLIDB System Using the Computational Paninian Grammar Framework, Asian Language Processing (IALP), 2012 International Conference on, pp. 93-96, 2012.

Bharati et al. Parsing Free Word Order Languages in the Paninian Framework, Proceedings of the 31st Annual Meeting on Association for Computational Linguistics, 1993.

* cited by examiner

STRUCTURED REPRESENTATION AND CLASSIFICATION OF NOISY AND UNSTRUCTURED TICKETS IN SERVICE DELIVERY

FIELD

The present application generally relates to information technology, and, more particularly, to ticket management techniques.

BACKGROUND

Ticket analysis helps create problem diagnostics, prediction of outages and prevention of issues in service delivery. Tickets can contain structured and unstructured text. Ticket generation can be traced back to events and logs thereof, wherein events can also contain unstructured text.

Existing ticket analysis approaches, however, are disadvantageous for many tickets (such as, for example, manually generated tickets) because ticket text can often be noisy and incomplete, as people are routinely measured by how quickly tickets can be closed.

SUMMARY

In one aspect of the present invention, techniques for structured representation and classification of noisy and unstructured tickets in service delivery are provided. An exemplary computer-implemented method can include steps of correlating one or more items of problem incident text data from a given problem incident identifier with one or more items of event text data to generate one or more items of correlated text data within the given problem incident identifier, wherein said correlating is executed by a correlation component of a computing device; and applying a syntactic grammar to the one or more items of correlated text data to identify in the given problem incident identifier (i) one or more domain-dependent concepts and (ii) one or more domain-independent concepts, wherein said applying is executed by a syntactic analysis component of the computing device. The method also includes parsing noisy and/or unstructured text from the given problem incident identifier based on analysis of (i) the one or more identified domain-dependent concepts and (ii) the one or more identified domain-independent concepts; and classifying the given problem incident identifier by classifying one or more features derived from text of the given problem incident identifier subsequent to said parsing of said noisy and/or unstructured text from the given problem incident identifier, wherein said classifying is executed by a type identification component of the computing device.

In another aspect of the invention, an exemplary computer-implemented method can include steps of correlating one or more items of problem incident text data from a given problem incident identifier with one or more items of event text data to generate one or more items of correlated text data within the given problem incident identifier, applying a syntactic grammar to the one or more items of correlated text data to identify in the given problem incident identifier (i) one or more domain-dependent concepts and (ii) one or more domain-independent concepts, and parsing noisy and/or unstructured text from the given problem incident identifier based on analysis of (i) the one or more identified domain-dependent concepts and (ii) the one or more identified domain-independent concepts to derive multiple structures of the given problem incident identifier. Such a method also includes categorizing the given problem incident identifier into one of a first category and a second category, wherein said first category comprises problem incident identifiers having derived structures that are contextually disjointed, wherein said second category comprises problem incident identifiers having derived structures that are not contextually disjointed, and wherein said categorizing comprises classifying one or more features derived from text of the given problem incident identifier subsequent to said parsing of said noisy and/or unstructured text.

Another aspect of the invention or elements thereof can be implemented in the form of an article of manufacture tangibly embodying computer readable instructions which, when implemented, cause a computer to carry out a plurality of method steps, as described herein. Furthermore, another aspect of the invention or elements thereof can be implemented in the form of an apparatus including a memory and at least one processor that is coupled to the memory and configured to perform noted method steps. Yet further, another aspect of the invention or elements thereof can be implemented in the form of means for carrying out the method steps described herein, or elements thereof; the means can include hardware module(s) or a combination of hardware and software modules, wherein the software modules are stored in a tangible computer-readable storage medium (or multiple such media).

These and other objects, features and advantages of the present invention will become apparent from the following detailed description of illustrative embodiments thereof, which is to be read in connection with the accompanying drawings.

DETAILED DESCRIPTION

Figure 1:
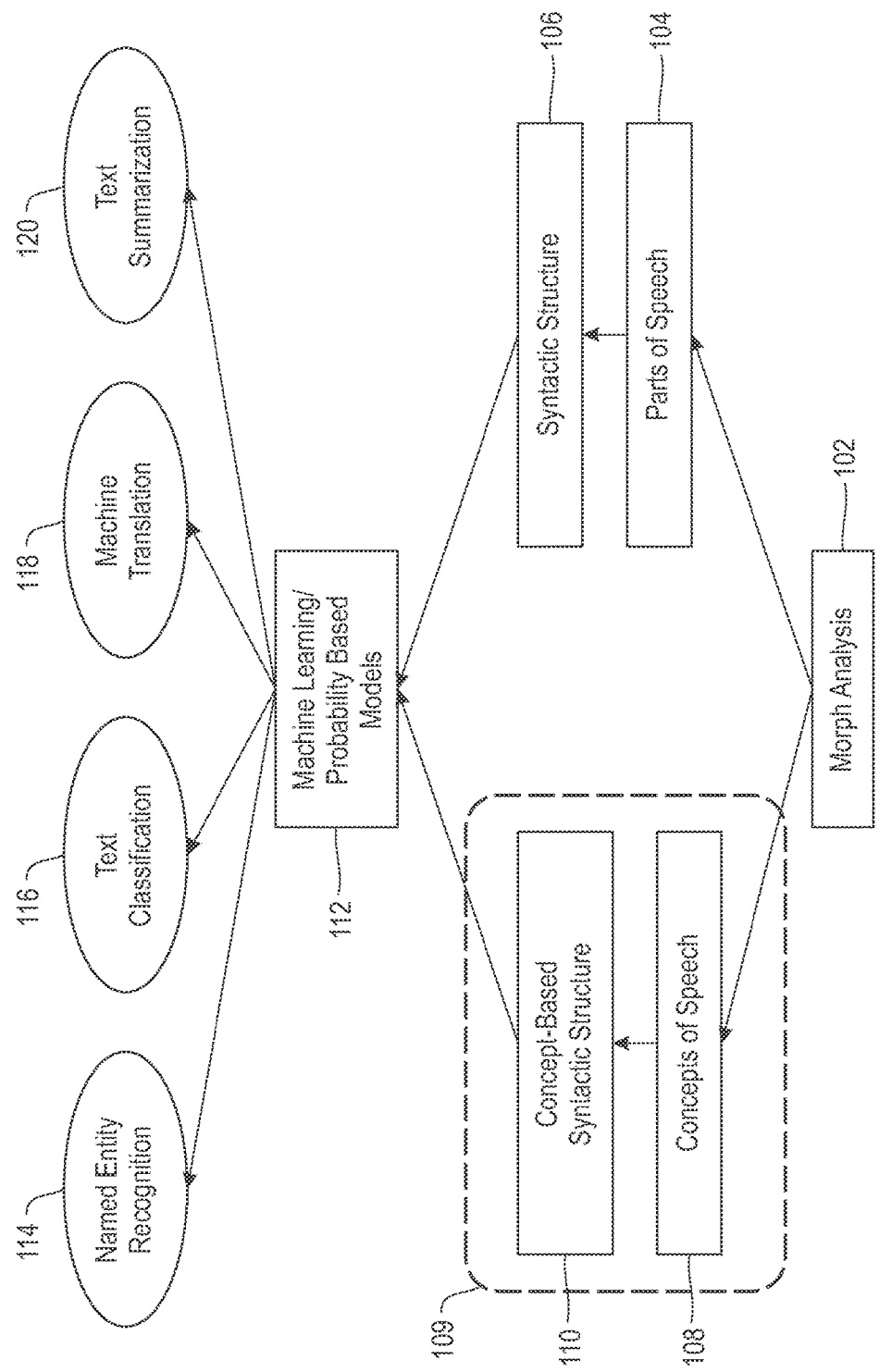
FIG. 1 is a diagram illustrating an example interface with other system components in an application stack, according to an example embodiment of the invention.

As described herein, an aspect of the present invention includes techniques for structured representation and classification of noisy and/or unstructured tickets in service delivery. As used herein, a "ticket" refers to a problem incident identifier, and "ticket data" refer to problem incident data. Ticketing systems record problems that are logged and resolved in the given environment. However, problem description texts are often extremely noisy, unstructured and often incomplete. Because human operators working on tickets are commonly measured on resolution time, they often provide terse descriptions for the problem descriptions and for the resolution actions performed. Normal human errors related to misspelling, misinterpretation and misrepresentation are also common. As noted, the interpretation of such unstructured texts is challenging for machines with existing parts of a grammar-based system.

At least one embodiment of the invention includes correlating event data with ticket data to create enriched data. As used herein, event data are defined as the complete knowledge about the events that is being probed in different systems and nodes. Below, Table 1 shows a sample schema for event data, and Table 2 shows sample event data. Ticket data are defined as the complete knowledge about how a ticket is generated, handled and resolved. Below, Table 3 shows an exemplary schema for ticket data, and Table 4 lists sample ticket data.

TABLE 1

Event Data Schema

| Field Name | Description |
| --- | --- |
| ID | Unique identifier for an event |
| Customer | Customer name |
| Node | System endpoint from where the event is generated |
| Agent | Monitoring agent that reported this event |
| Severity | Severity on the scale from 1 (FATAL) to 5 (WARNING) |
| Description | Free text description to summarize the event |
| Occurrence Time | Timestamp when the event occurs |
| Ticket Number | The ticket number, if a ticket is generated for this event |

TABLE 2

Sample Event Data

| ID | Severity | Description | Ticket Number |
| --- | --- | --- | --- |
| 100 | 3 | CPU workload high (85%) for server "x.x.x.x" | — |
| 101 | 2 | Web application failed, URL failures detected | TIK211 |
| 102 | 1 | High space used (92%) for "C" drive | TIK312 |

TABLE 3

Ticket Data Schema

| Field Name | Description |
| --- | --- |
| Ticker Number | Unique Ticket identifier |
| Customer | Name of the customer |
| Status | Current status towards resolution |
| Open_date-time | Timestamp when ticket was created |
| Close_date-time | Timestamp when ticket was resolved |
| Severity | Severity of incident |
| Description | Free text information on how ticket is handled |
| Cause | Root cause analysis |

TABLE 4

Sample Ticket Data

| ID | Description | Resolution | Cause |
| --- | --- | --- | --- |
| 201 | High processor usage | Checked for process utilization | High CPU usage |
| 202 | Space Issue in CMS app | Archived logs | High space used |
| 203 | None specified | Action is taken | Server not responding |

Additionally, at least one embodiment of the invention includes implementing techniques for noisy text analysis on the enriched data, wherein such techniques include interpreting, evaluating and/or classifying one or more inherent features of given text. For instance, an example embodiment of the invention can include analyzing data from tickets and correlated events by classifying keywords and/or concepts based on a domain and/or context of a given problem. Such an embodiment implements a noisy natural language processing (NLP) formalism, also referred to herein as n-NLP. Further, such an embodiment can additionally include classifying noisy and/or unstructured tickets by utilizing analyzed ticket and event data (via the n-NLP formalism).

Accordingly, at least one embodiment of the invention includes implementing a syntactic grammar to parse noisy and/or unstructured ticket text. Additionally, in such an embodiment, a deduced structured representation of the unstructured ticket text is utilized to perform a classification task. At least one embodiment of the invention also includes implementing a correlation algorithm to deduce a mapping function between tickets and events.

As such, and as further detailed herein, n-NLP is implemented in one or more embodiments of the invention to generate a parsed structure. n-NLP, as described herein, provides generalization as well as scalability, as the generated parsed structure can be used for the classification of tickets and the training data required to learn context is reduced greatly from that of existing approaches.

FIG. 1 is a diagram illustrating an example interface with other system components in an application stack, according to an example embodiment of the invention. By way of illustration, FIG. 1 depicts a morphological (morph) analysis component 102, which provides input to a parts of speech component 104 as well as to a concepts of speech component 108. The concepts of speech component 108 is part of a larger module 109 that also includes a concept-based syntactic structure component 110, which takes input from the concepts of speech component 108 and generates output to be utilized by a machine learning and/or probability based models component 112.

Similarly, the parts of speech component 104 provides input to a syntactic structure component 106, which in turn provides output to be utilized by the machine learning and/or probability based models component 112. Further, the machine learning and/or probability based models component 112, based on the received input, generates a named entity recognition element 114, a text classification element 116, a machine translation element 118 and a text summarization element 120.

As shown in FIG. 1, features obtained from morphological analysis (via component 102), followed by parts of speech tagging (via component 104) and phrase based syntactic parsing (via component 106) can be used in rule-based or learning-based text analysis problems such as named entity recognition, text classification, machine translation, text summarization, etc. For analyzing unstructured and noisy texts, at least one embodiment of the invention includes carrying out an alternate process flow that includes morphological analysis (via component 102) followed by concepts of speech parsing (via component 108) and concept based syntactic parsing (via component 110).

Additionally, aspects of one or more embodiments of the invention can include, for example, utilizing phrase structure grammar (PSG), computational Paninian grammar (CPG) (also referred to as Karaka Labels), and concept-based syntactic grammar (CSG). PSG pertains to meaning and syntax, whereby a sentence structure is viewed in terms of constituency relationships. Based thereon, a pure syntactic structure can be derived, and based on the syntactic structure, one or more additional higher level interpretations can be derived.

Also, CPG pertains to meaning and partial constraints on syntax, whereby a sentence structure is viewed in terms of modifier-modified relationships. Based thereon, a syntactic-semantic structure can be derived. Further, CSG pertains to only meaning, with no constraints on structure. Accordingly, a sentence structure is viewed in terms of domain dependent and independent concepts. Based thereon, a concept-based syntactic structure can be derived.

Figure 2:
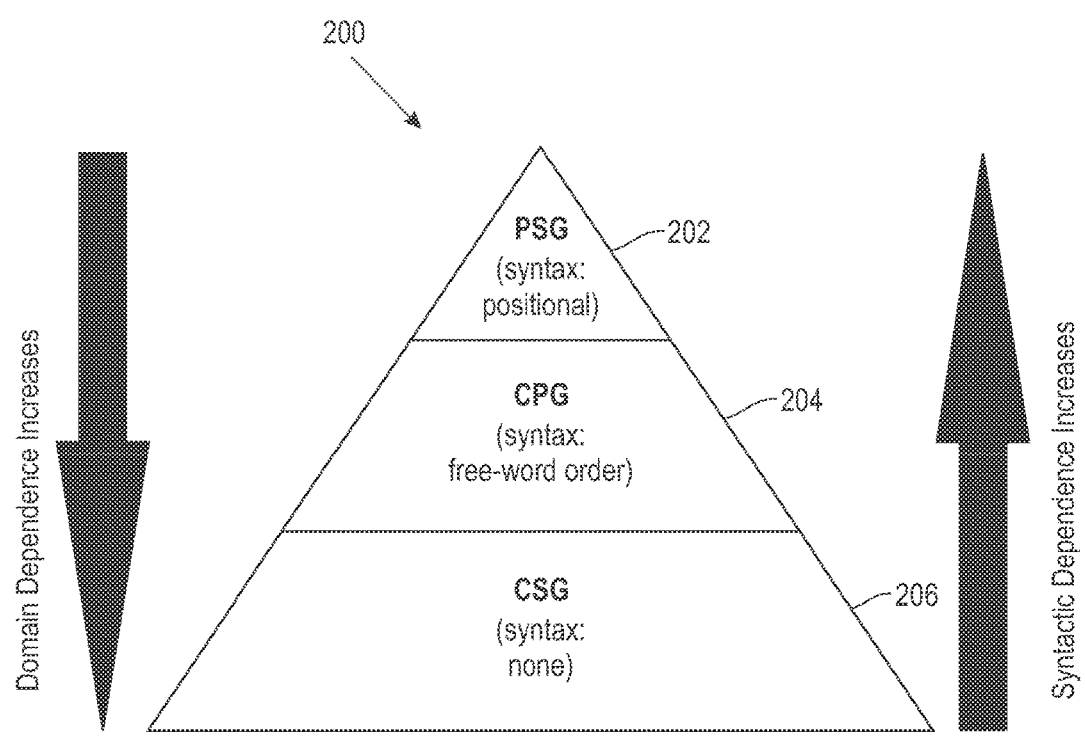
FIG. 2 is a diagram illustrating a comparison of concept-based syntactic grammar (CSG) with phrase structure grammar (PSG) and computational Paninian grammar (CPG)

FIG. 2 includes a comparison of CSG 206 with PSG 202 and CPG 204. PSG 202 is commonly used for analyzing texts with proper syntax structure, but is not useful for noisy and unstructured texts. CPG 204 considers information as central to the study of language and depends partially on the syntax structure. Hence, CSG 206 can be placed at the bottom of the syntax pyramid. Observe that the syntax dependence increases and the domain dependence decreases towards the top of the pyramid.

Additionally, in conjunction with one or more embodiments of the invention, various n-NLP notations and/or terminology can be utilized. For example, any text-based problem can be referred to as an "n-task" if the text is noisy. Such problems might include, for instance, classification of noisy sentences, extraction of contextual information from noisy sentences, etc. Also, any information which is important or useful for solving the n-task can be referred to as an "n-concept." Further, an "n-abstraction" refers to the mode of abstraction utilized to describe an n-concept.

Figure 3:
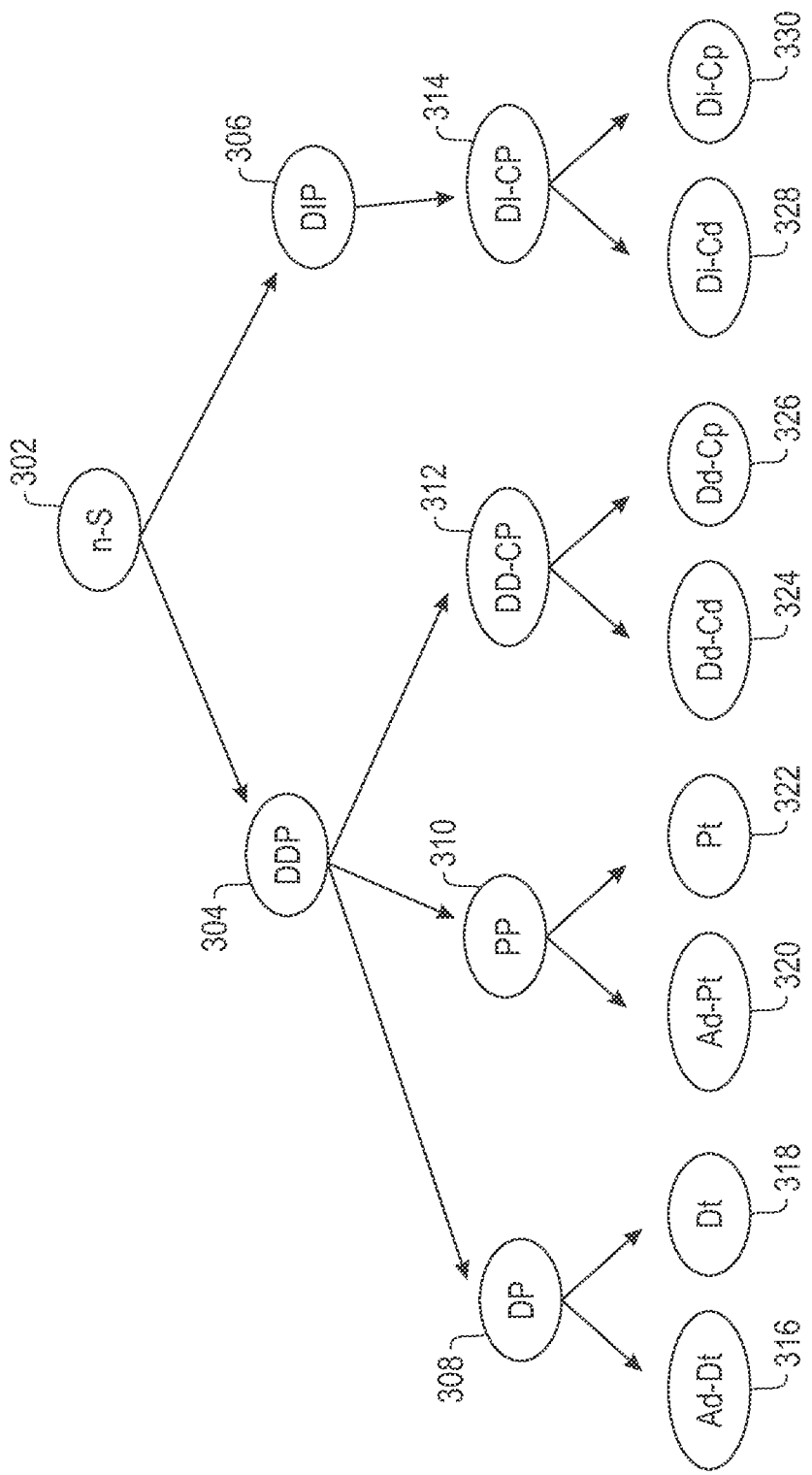
FIG. 3 is a diagram illustrating CSG, according to an example embodiment of the invention.

FIG. 3 is a diagram illustrating concept-based syntactic grammar (CSG), according to an example embodiment of the invention. By way of illustration, FIG. 3 depicts a formal grammar to describe the structure of noisy natural language sentences, including a noisy sentence (n-S) element 302, which can be parsed into a domain dependent phrase (DDP) element 304 and a domain independent phrase (DIP) element 306. Additionally, the DDP element 304 can be parsed into a discriminator phrase (DP) element 308, a pattern phrase (PP) element 310, and a domain dependent contextual phrase (DD-CP) element 312, while the DIP element 306 can be parsed into a domain independent contextual phrase (DI-CP) element 314.

Further, as illustrated in FIG. 3, the DP element 308 can be parsed into an adjunct-discriminator (Ad-Dt) element 316 and a discriminator (Dt) element 318, wherein the Ad-Dt element 316 includes domain specific keywords of n-concepts, which help in describing discriminators and patterns, and the Dt element 318 includes domain specific keywords of n-concepts in the sentence/ticket which help in the identification of a topic or a focus. Additionally, the PP element 310 can be parsed into an adjunct-pattern (Ad-Pt) element 320 and a pattern (Pt) element 322, wherein the Ad-Pt element 320 includes domain specific abstractions of n-concepts, which help in describing discriminators and patterns, and the Pt element 322 includes domain specific abstractions of n-concepts in the sentence, which help in the identification of a topic or a focus.

As also depicted in FIG. 3, the DD-CP element 312 can be parsed into a domain dependent context-discriminator (Dd-Cd) element 324 and a domain dependent context-pattern (Dd-Cp) element 326, wherein the Dd-Cd element 324 includes domain specific keywords of n-concepts, which help in determining the context, and the Dd-Cp element 326 includes domain specific abstractions of n-concepts, which help in determining the context. Further, the DI-CP element 314 can be parsed into a domain invariant context-discriminator (Di-Cd) element 328 and a domain invariant context-pattern (Di-Cp) element 330, wherein the Di-Cd element 328 includes domain independent keywords of n-concepts, which help in determining the context, and the Di-Cp element 330 includes domain independent abstractions of n-concepts, which help in determining the context.

By way of example, consider the following noisy service delivery ticket:

"[PNDPCK286] MINOR-[PRTG Network Monitor (DC-NMG-IS01)] MDL-CAT 10.20.8.242*BDI102162* (Ping) Down (Request timed out (ICMP error #11010))"

Figure 4:
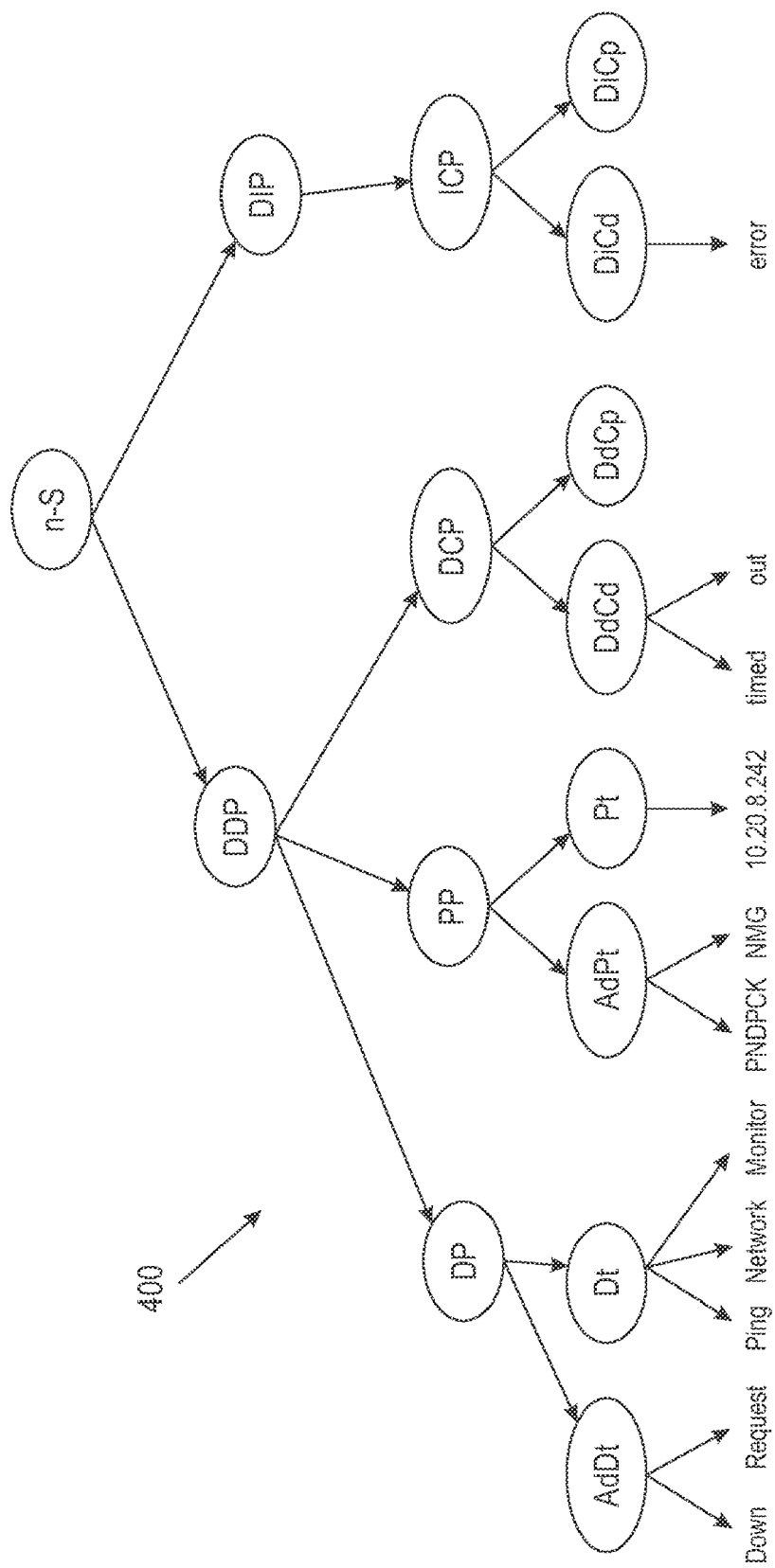
FIG. 4 is a diagram illustrating the CSG for this sentence.

In this ticket, the eight concepts of speech identified are shown below. The keywords "Ping," "Network," and "Monitor" are tagged as discriminators because they determine the main topic of ticket (that is, a network issue). Similarly, the internet protocol (IP) address pattern identified in the ticket can also help in identification of the main topic. The adjunct-discriminators such as "Down" and "Request," and the adjunct-patterns such as "PNDPCK" and "NMG" do not determine the main topic, as such items are not specific to a network issue (that is, they can occur in various other contexts such as "Server is down," "Password change request," etc. Though such items fail to determine the main topic of the ticket, they can help in describing the discriminators and patterns. Note that 'PNDPCK' and 'NMG' are abbreviation patterns. Keywords such as "timed," "out," and "error" help in establishing the context of the main topic in the ticket. FIG. 4 illustrates the CSG 400 for this sentence.

n-NLP lexical categories:
Dt={"Ping", "Network", "Monitor"}
Pt={"10.20.8.242"}//Note: 10.20.8.242 is an instance of pattern 'x.x.x.x'
Ad-Dt={"Down", "Request"}
Ad-Pt={"PNDPCK", "NMG"}
Dd-Cd={"timed", "out"}
Dd-Cp={ }
Di-Cd={"error"}
Di-Cp={ }

As detailed herein, at least one embodiment of the invention includes classification of noisy tickets using the noted n-NLP formalism. Such an embodiment includes classifying noisy and/or unstructured service delivery tickets to a set of pre-defined output categories. As described herein, semantics can be utilized to understand the contextual information in tickets and/or sentences. Accordingly, at least one embodiment of the invention includes defining a domain-based structure for a given set of tickets and classifying the tickets to one of the pre-defined output categories.

By way of example and illustration, let N be the total number of output categories. For a given ticket, an example embodiment of the invention includes deriving N n-NLP structures based on the pre-defined keywords of the N output categories. Further, notations used in connection with this example embodiment (and others) can include the following. $t_i$ denotes the $i_{th}$ ticket, $L_i$ denotes the set of N structures of $t_i$, and $l_{ik}$ denotes the $k_{th}$ structure in $L_i$. $DP_{ik}$, $PP_{ik}$ denotes discriminator and pattern phrases in the $k_{th}$ structure of ticket $t_i$. Such an example embodiment of the invention includes defining the pair of any two structures $(l_{ij}, l_{ik})$ of a ticket $t_i$ as contextually disjointed if the below two conditions are satisfied:

(a) for all j, k=1, 2, 3, . . . , N: $DP_{ij} \cap DP_{ik} = \phi$
(b) for all j, k=1, 2, 3, . . . , N: $PP_{ij} \cap PP_{ik} = \phi$ Based on the contextual disjointed status, the example embodiment of the invention can further include categorizing the tickets into the two categories of simple tickets and complex tickets. A ticket is categorized as a simple ticket if all of the highly-ranked structures of the given ticket are contextually disjointed. A ticket is categorized as a complex ticket if any two highly-ranked structures of the given ticket are not to contextually disjointed. Additionally, such an example embodiment of the invention can also include normalizing tickets before deriving structures, wherein normalizing can include filtering functional words, filtering stop words, and/or performing a morphological analysis followed by stemming.

In connection with the above, classification of simple tickets can include implementing a linear weight-based approach to score the structures of a ticket, and assigning to the ticket the output category corresponding to the highest scored structure. Additionally, weights can be assigned to keywords present in one or more lexical categories of a given structure based on the discriminative capability of the lexical categories.

Classification of complex tickets, for example, can include the following aspects. As the structures of complex tickets are not contextually disjointed, a linear weight-based approach may fail to discriminate between the structures. Accordingly, at least one embodiment of the invention includes using a supervised learning approach to learn contextual information from complex tickets. In such an embodiment, feature weights can be assigned based on the discriminative capability of keywords. For example, keywords which have the concept of speech labeled as "discriminator" are assigned more weight than keywords which have the concept of speech labeled as "adjunct-discriminator." Below is, in connection with one or more embodiments of the invention, a complete order among concepts of speech based on which weights are assigned to keywords:
(Discriminators=Patterns)>(Adjunct-
Discriminators=Adjunct-Patterns)>(Domain Dependent Context Discriminator=Domain Dependent Context Pattern)>(Domain Invariant Context Discriminator=Domain Invariant Context Pattern).

Using a rule- and/or weight-based approach for classifying simple tickets increases recall. Additionally, one or more embodiments of the invention can also include validating the output of a rule- and/or weight-based approach via implementation of context-based analysis to filter out any misclassifications. In order to evaluate the performance of a rule-based approach, one can compare the output of the rule-based approach to the above-mentioned learning-based approach. This validation may provide new insights on the weighting order used in the rule-based approach.

Figure 5:
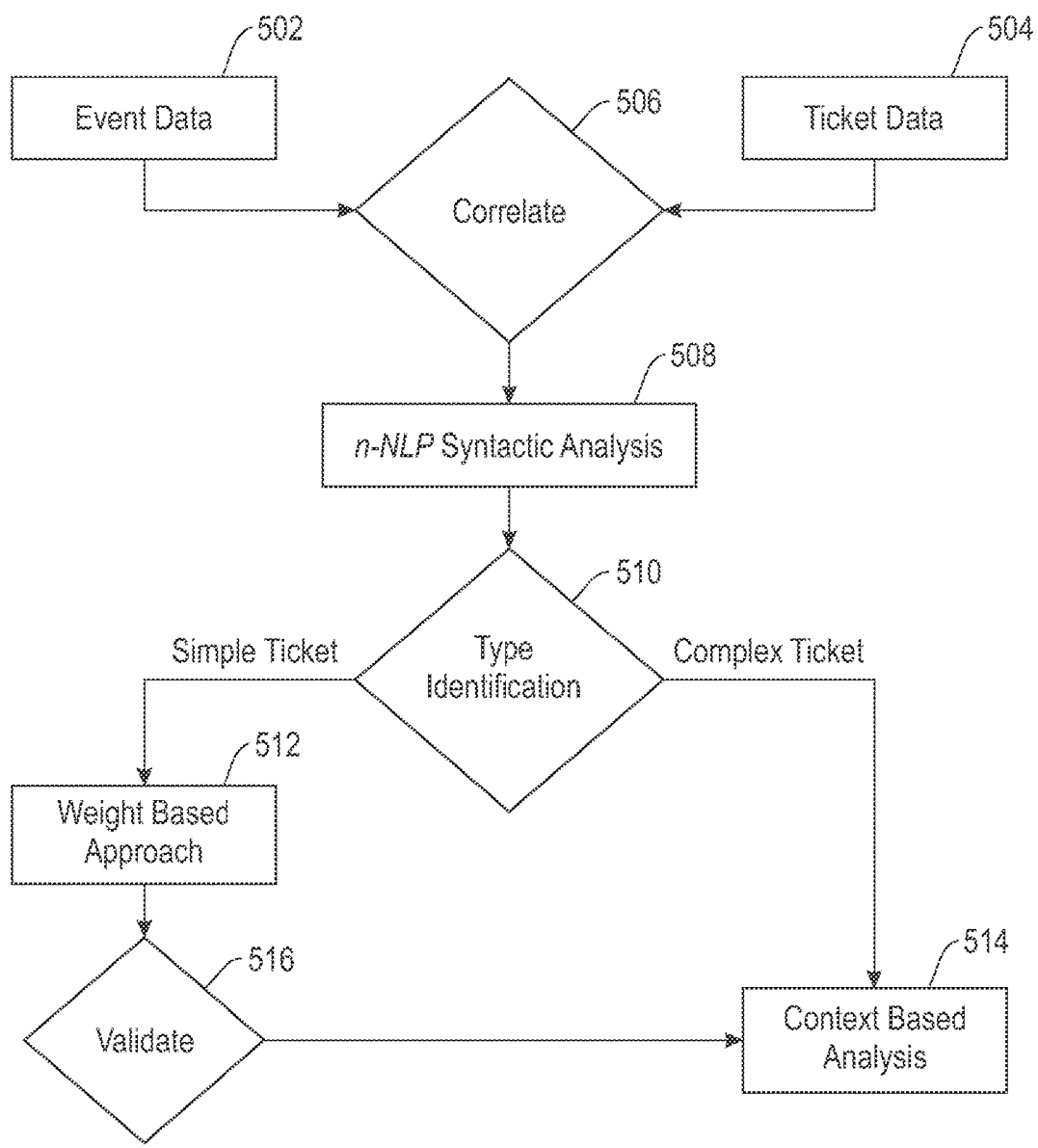
FIG. 5 is a diagram illustrating a process flow architecture according to an embodiment of the invention.

FIG. 5 is a diagram illustrating a ticket classification process flow architecture according to an embodiment of the invention. By way of illustration, FIG. 5 depicts event data 502 and ticket data 504 being correlated via a correlation component 506, which provides correlated data output to an n-NLP syntactic analysis component 508, which performs the concept of speech tagging from which concept based syntactic structures are derived.

Output from the n-NLP syntactic analysis component 508 is provided to a type identification component 510, which makes a determination regarding the categorization of a given ticket; that is, whether the given ticket is a simple ticket or a complex ticket. A simple ticket (as determined via component 510) is forwarded to a weight-based approach component 512 subsequently validated via validation component 516 and provided to a context-based analysis component 514. Via the weight-based approach component 512, the output category corresponding to the highest-scored concept based syntactic structure ($l_{jk}$) of simple ticket ($t_i$) is assigned to the ticket. Weights are assigned to various fields of structure based on their discriminative capability.

A complex ticket (as determined via component 510) is forwarded directly to the context-based analysis component 514, which uses support vector machine (SVM) techniques with a radial basis function (RBF) kernel to classify the complex tickets.

In connection with component 504, at least one embodiment of the invention includes event data and ticket data correlation. Such an embodiment, given a ticket and the ticket's creation timestamp, description details, etc., includes identifying the most probable original event which created the ticket. Accordingly, at least one embodiment of the invention includes generating a probability-based model to associate one or more events with a ticket and selecting and/or determining the event with a highest correlation probability, provided that the value is larger than a threshold (confidence) value.

Model components can include, for example, $P_{corr}(t)$, which represents a correlation probability based on ticket generation lag (t). Moreover, $P_{corr}(t)$ is inversely proportional to ticket generation lag (t). Lag distribution is modeled based on domain information and existing ticket-event mapping data. Additionally, $I_{\{Server\ Match\}}$ represents an indicator function representing a server match, and $I_{\{Serve\ Match\}}=1$ if a common server name exists in both the ticket and the event problem description; else, $I_{\{Server\ Match\}}=0$. Further, $S_{corr}$ (Context-Match) represents the contextual similarity measure in problem descriptions, which can be modeled based on syntax-level analysis to compute the contextual similarity between the ticket and the event problem descriptions, and can also be normalized to restrict between 0 and 1. At least one embodiment of the invention can also include utilizing other model components such as application group, severity, etc.

Accordingly, one or more embodiments of the invention include, as noted above, determining a correlation probability via the following function: $w_1 * P_{corr}(t) + w_2 * I_{\{Server\ Match\}} + w_3 * S_{corr}$(Context-Match), wherein $w_1$, $w_2$ and $w_3$ are the weights assigned to correlation components $P_{corr}(t)$, $I_{\{Server\ Match\}}$ and $S_{corr}$(Context-Match), respectively.

Figure 6:
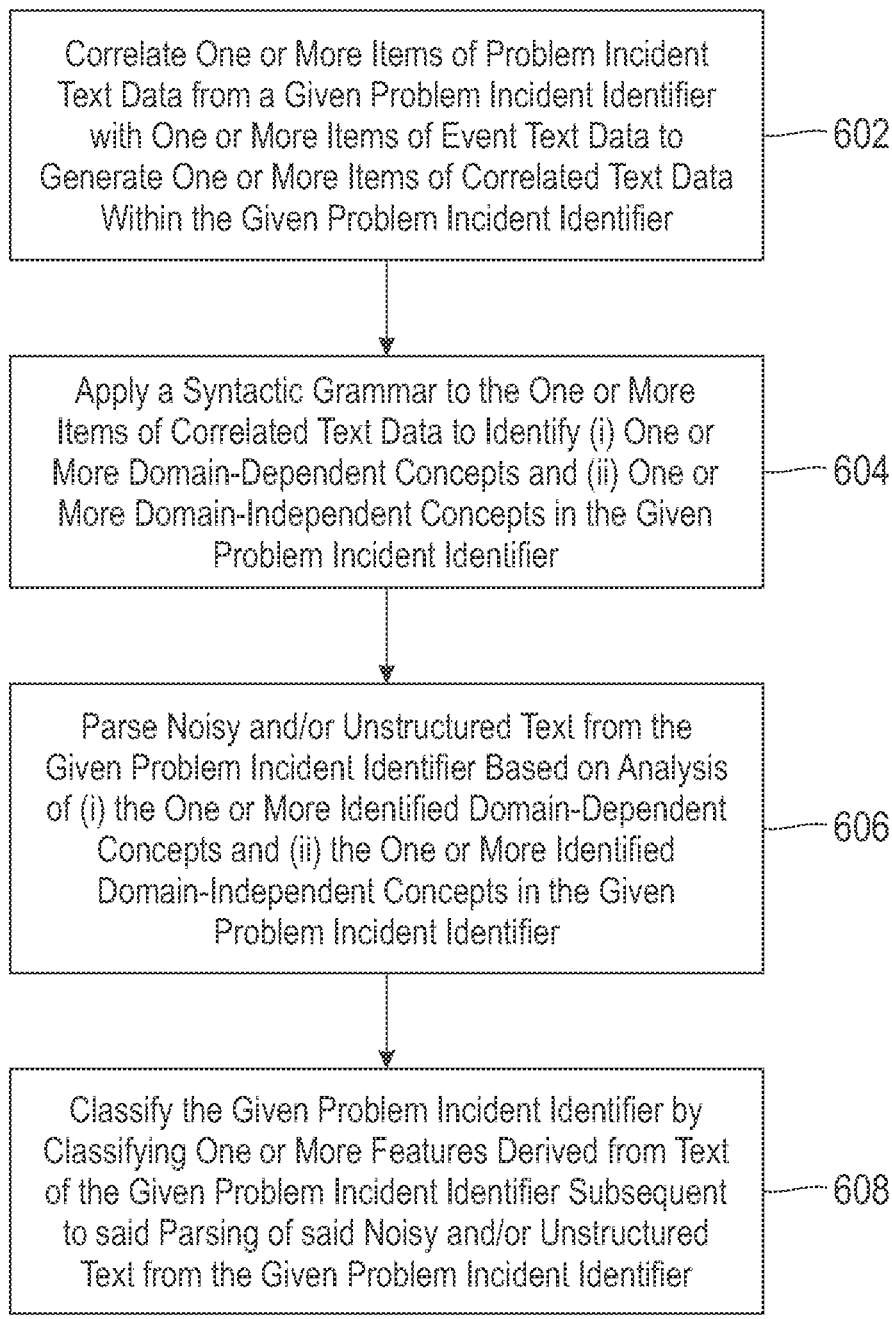
FIG. 6 is a flow diagram illustrating techniques according to an embodiment of the invention.

FIG. 6 is a flow diagram illustrating techniques according to an embodiment of the present invention. Step 602 includes correlating one or more items of problem incident text data (ticket data) from a given problem incident identifier (ticket) with one or more items of event text data to generate one or more items of correlated text data within the given problem incident identifier, wherein said correlating is executed by a correlation component of a computing device. Correlating can include implementing a correlation algorithm to deduce a mapping function between the one or more items of problem incident text data derived from the given problem incident identifier and the one or more items of event text data. Additionally, correlating can include utilizing semantics to determine one or more items of contextual information in the one or more items of problem incident text data derived from the given problem incident identifier and in the one or more items of event text data.

Further, correlating can include determining a correlation probability between the one or more items of problem incident text data derived from the given problem incident identifier and the one or more items of event text data based on one or more model components. The model components can include an indicator function representing a server match, wherein a server match comprises an instance wherein a common server name exists in the given problem incident identifier and in a given event problem description. The model components can also include a contextual similarity measure in problem descriptions based on a syntax-level analysis of the given problem incident identifier and a given event problem description to compute the contextual similarity between the given problem incident identifier and the given event problem description.

Step 604 includes applying a syntactic grammar to the one or more items of correlated text data to identify in the given problem incident identifier (i) one or more domain-dependent concepts and (ii) one or more domain-independent concepts, wherein said applying is executed by a syntactic analysis component of the computing device. Additionally, applying the syntactic grammar can include defining a domain-based structure for the given problem incident identifier.

Step 606 includes parsing noisy and/or unstructured text from the given problem incident identifier based on analysis of (i) the one or more identified domain-dependent concepts and (ii) the one or more identified domain-independent concepts. At least one embodiment of the invention can include deriving a concept-based syntactic structure of the given problem incident identifier based on identification of one or more domain-dependent concepts and one or more domain-independent concepts in the given problem incident identifier.

Step 608 includes classifying the given problem incident identifier by classifying one or more features derived from text of the given problem incident identifier subsequent to said parsing of said noisy and/or unstructured text from the given problem incident identifier, wherein said classifying is executed by a type identification component of the computing device. The one or more features can include one or more keywords and/or one or more concepts derived from text of the given problem incident identifier subsequent to said parsing. Also, classifying can include classifying the given problem incident identifier into a set of multiple pre-defined categories.

The techniques depicted in FIG. 6 can also include normalizing the given problem incident identifier prior to applying the syntactic grammar. Normalizing can include filtering one or more functional words from the given problem incident identifier and/or filtering one or more stop words from the given problem incident identifier. Additionally, normalizing can include (i) performing a morphological analysis of the text of the given problem incident identifier and (ii) stemming one or more words of the given problem incident identifier based on said morphological analysis.

Also, one or more embodiments of the invention include techniques that include correlating one or more items of problem incident text data from a given problem incident identifier with one or more items of event text data to generate one or more items of correlated text data within the given problem incident identifier, applying a syntactic grammar to the one or more items of correlated text data to identify in the given problem incident identifier (i) one- or more domain-dependent concepts and (ii) one or more domain-independent concepts, and parsing noisy and/or unstructured text from the given problem incident identifier based on analysis of (i) the one or more identified domain-dependent concepts and (ii) the one or more identified domain-independent concepts to derive multiple structures of the given problem incident identifier. Such techniques also include categorizing the given problem incident identifier into one of a first category and a second category, wherein said first category comprises problem incident identifiers having derived structures that are contextually disjointed, wherein said second category comprises problem incident identifiers having derived structures that are not contextually disjointed, and wherein said categorizing comprises classifying one or more features derived from text of the given problem incident identifier subsequent to said parsing of said noisy and/or unstructured text.

In such an embodiment, categorizing the given problem incident identifier can include implementing a linear weight-based technique to (i) score the multiple derived structures of the given problem incident identifier and (ii) assign to the given problem incident identifier the category corresponding to the highest-scored derived structure. Additionally, such an embodiment can further include applying a weight to each of the one or more keywords and/or the one or more concepts, as well as validating a categorization via implementation of a context-based analysis to filter out a misclassification.

The techniques depicted in FIG. 6 can also, as described herein, include providing a system, wherein the system includes distinct software modules, each of the distinct software modules being embodied on a tangible computer-readable recordable storage medium. All of the modules (or any subset thereof) can be on the same medium, or each can be on a different medium, for example. The modules can include any or all of the components shown in the figures and/or described herein. In an aspect of the invention, the modules can run, for example, on a hardware processor. The method steps can then be carried out using the distinct software modules of the system, as described above, executing on a hardware processor. Further, a computer program product can include a tangible computer-readable recordable storage medium with code adapted to be executed to carry out at least one method step described herein, including the provision of the system with the distinct software modules.

Additionally, the techniques depicted in FIG. 6 can be implemented via a computer program product that can include computer useable program code that is stored in a computer readable storage medium in a data processing system, and wherein the computer useable program code was downloaded over a network from a remote data processing system. Also, in an aspect of the invention, the computer program product can include computer useable program code that is stored in a computer readable storage medium in a server data processing system, and wherein the computer useable program code is downloaded over a network to a remote data processing system for use in a computer readable storage medium with the remote system.

An aspect of the invention or elements thereof can be implemented in the form of an apparatus including a memory and at least one processor that is coupled to the memory and configured to perform exemplary method steps.

Figure 7:
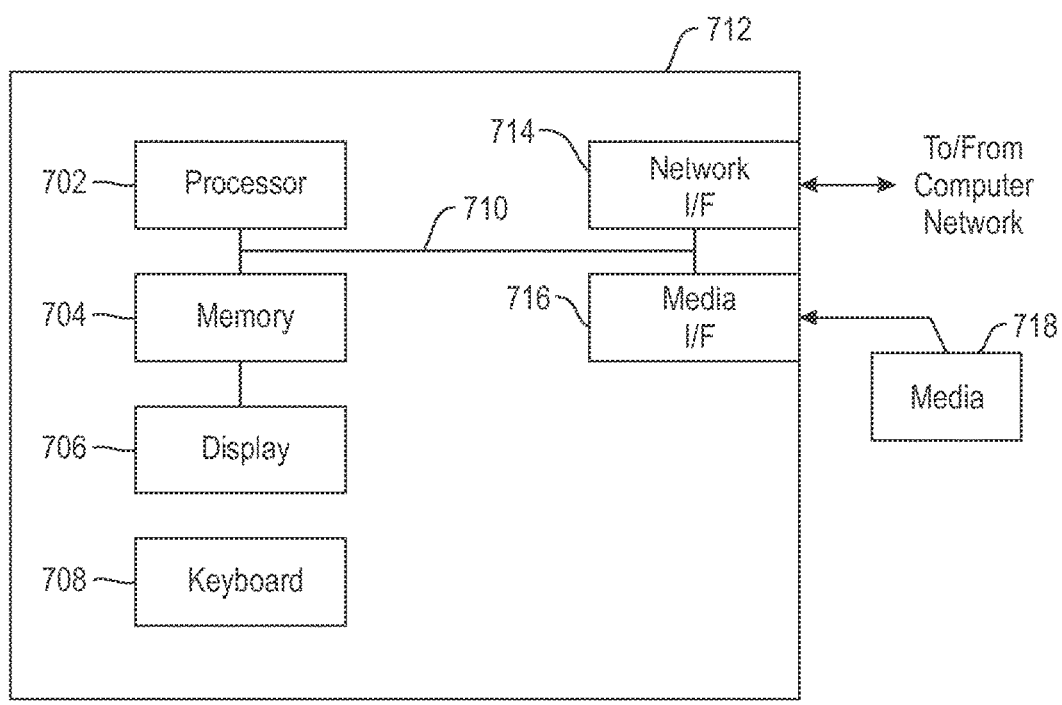
FIG. 7 is a system diagram of an exemplary computer system on which at least one embodiment of the invention can be implemented.

Additionally, an aspect of the present invention can make use of software running on a general purpose computer or workstation. With reference to FIG. 7, such an implementation might employ, for example, a processor 702, a memory 704, and an input/output interface formed, for example, by a display 706 and a keyboard 708. The term "processor" as used herein is intended to include any processing device, such as, for example, one that includes a CPU (central processing unit) and/or other forms of processing circuitry. Further, the term "processor" may refer to more than one individual processor. The term "memory" is intended to include memory associated with a processor or CPU, such as, for example, RAM (random access memory), ROM (read only memory), a fixed memory device (for example, hard drive), a removable memory device (for example, diskette), a flash memory and the like. In addition, the phrase "input/output interface" as used herein, is intended to include, for example, a mechanism for inputting data to the processing unit (for example, mouse), and a mechanism for providing results associated with the processing unit (for example, printer). The processor 702, memory 704, and input/output interface such as display 706 and keyboard 708 can be interconnected, for example, via bus 710 as part of a data processing unit 712. Suitable interconnections, for example via bus 710, can also be provided to a network interface 714, such as a network card, which can be provided to interface with a computer network, and to a media interface 716, such as a diskette or CD-ROM drive, which can be provided to interface with media 718.

Accordingly, computer software including instructions or code for performing the methodologies of the invention, as described herein, may be stored in associated memory devices (for example, ROM, fixed or removable memory) and, when ready to be utilized, loaded in part or in whole (for example, into RAM) and implemented by a CPU. Such software could include, but is not limited to, firmware, resident software, microcode, and the like.

A data processing system suitable for storing and/or executing program code will include at least one processor 702 coupled directly or indirectly to memory elements 704 through a system bus 710. The memory elements can include local memory employed during actual implementation of the program code, bulk storage, and cache memories which provide temporary storage of at least some program code in order to reduce the number of times code must be retrieved from bulk storage during implementation.

Input/output or I/O devices (including but not limited to keyboards 708, displays 706, pointing devices, and the like) can be coupled to the system either directly (such as via bus 710) or through intervening I/O controllers (omitted for clarity).

Network adapters such as network interface 714 may also be coupled to the system to enable the data processing system to become coupled to other data processing systems or remote printers or storage-devices through intervening private or public networks. Modems, cable modems and Ethernet cards are just a few of the currently available types of network adapters.

As used herein, including the claims, a "server" includes a physical data processing system (for example, system 712 as shown in FIG. 7) running a server program. It will be understood that such a physical server may or may not include a display and keyboard.

As will be appreciated by one skilled in the art, aspects of the present invention may be embodied as a system, method and/or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, as noted herein, aspects of the present invention may take the form of a computer program product that may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (for example, light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowcharts and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It should be noted that any of the methods described herein can include an additional step of providing a system comprising distinct software modules embodied on a computer readable storage medium; the modules can include, for example, any or all of the components detailed herein. The method steps can then be carried out using the distinct software modules and/or sub-modules of the system, as described above, executing on a hardware processor 702. Further, a computer program product can include a computer-readable storage medium with code adapted to be implemented to carry out at least one method step described herein, including the provision of the system with the distinct software modules.

In any case, it should be understood that the components illustrated herein may be implemented in various forms of hardware, software, or combinations thereof, for example, application specific integrated circuit(s) (ASICS), functional circuitry, an appropriately programmed general purpose digital computer with associated memory, and the like. Given the teachings of the invention provided herein, one of ordinary skill in the related art will be able to contemplate other implementations of the components of the invention.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of another feature, integer, step, operation, element, component, and/or group thereof.

The corresponding structures, materials, acts, and equivalents of all means or step plus function elements in the claims below are intended to include any structure, material, or act for performing the function in combination with other claimed elements as specifically claimed.

At least one aspect of the present invention may provide a beneficial effect such as, for example, analyzing data from tickets and events by classifying keywords and concepts based on the domain and/or context of a problem, as well as classifying noisy and unstructured tickets by utilizing analyzed ticket and event data.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method, comprising:
    correlating one or more items of problem incident text data from a given problem incident identifier with one or more items of event text data to generate one or more items of correlated text data within the given problem incident identifier, wherein said correlating is executed by a correlation component of a computing device;
    applying a syntactic grammar to the one or more items of correlated text data to identify in the given problem incident identifier (i) one or more domain-dependent concepts and (ii) one or more domain-independent concepts, wherein said applying is executed by a syntactic analysis component of the computing device;
    parsing noisy and/or unstructured text from the given problem incident identifier based on analysis of (i) the one or more identified domain-dependent concepts and (ii) the one or more identified domain-independent concepts; and
    classifying the given problem incident identifier by classifying one or more features derived from text of the given problem incident identifier subsequent to said parsing of said noisy and/or unstructured text from the given problem incident identifier, wherein said classifying is executed by a type identification component of the computing device.

2. The method of claim 1, wherein said correlating comprises implementing a correlation algorithm to deduce a mapping function between (i) the one or more items of problem incident text data derived from the given problem incident identifier and (ii) the one or more items of event text data.

3. The method of claim 1, wherein said correlating comprises utilizing semantics to determine one or more items of contextual information in (i) the one or more items of problem incident text data and in (ii) the one or more items of event text data.

4. The method of claim 1, wherein said correlating comprises determining a correlation probability between (i) the one or more items of problem incident text data derived from the given problem incident identifier and (ii) the one or more items of event text data based on one or more model components.

5. The method of claim 4, wherein the one or more model components comprises an indicator function representing a server match, wherein a server match comprises an instance wherein a common server name exists in (i) the given problem incident identifier and in (ii) a given event problem description.

6. The method of claim 4, wherein the one or more model components comprises a contextual similarity measure in problem descriptions based on a syntax-level analysis of (i) the given problem incident identifier and (ii) a given event problem description to compute the contextual similarity between the (i) given problem incident identifier and (ii) the given event problem description.

7. The method of claim 1, wherein the one or more features comprise one or more keywords and/or one or more concepts derived from text of the given problem incident identifier subsequent to said parsing.

8. The method of claim 1, wherein said applying comprises defining a domain-based structure, for the given problem incident identifier.

9. The method of claim 1, wherein said classifying comprises classifying the given problem incident identifier into a set of multiple pre-defined categories.

10. The method of claim 1, comprising:
normalizing the given problem incident identifier prior to said applying the syntactic grammar.

11. The method of claim 10, wherein said normalizing comprises filtering one or more functional words from the given problem incident identifier.

12. The method of claim 10, wherein said normalizing comprises filtering one or more stop words from the given problem incident identifier.

13. The method of claim 10, wherein said normalizing comprises (i) performing a morphological analysis of the text of the given problem incident identifier and (ii) stemming one or more words of the given problem incident identifier based on said morphological analysis.

14. A computer program product, the computer program product comprising a computer-readable storage medium having program instructions embodied therewith, the program instructions executable by a computing device to cause the computing device to:
correlate one or more items of problem incident text data from a given problem incident identifier with one or more items of event text data to generate one or more items of correlated text data within the given problem incident identifier;
apply a syntactic grammar to the one or more items of correlated text data to identify in the given problem incident identifier (i) one or more domain-dependent concepts and (ii) one or more domain-independent concepts;
parse noisy and/or unstructured text from the given problem incident identifier based on analysis of (i) the one or more identified domain-dependent concepts and (ii) the one or more identified domain-independent concepts; and
classify the given problem incident identifier by classifying one or more features derived from text of the given problem incident identifier subsequent to said parsing of said noisy and/or unstructured text from the given problem incident identifier.

15. The computer program product of claim 14, wherein said correlating comprises implementing a correlation algorithm to deduce a mapping function between (i) the one or more items of problem incident text data derived from the given problem incident identifier and (ii) the one or more items of event text data.

16. A system comprising:
a memory; and
at least one processor coupled to the memory and configured for:
correlating one or more items of problem incident text data from a given problem incident identifier with one or more items of event text data to generate one or more items of correlated text data within the given problem incident identifier;
applying a syntactic grammar to the one or more items of correlated text data to identify in the given problem incident identifier (i) one or more domain-dependent concepts and (ii) one or more domain-independent concepts;
parsing noisy and/or unstructured text from the given problem incident identifier based on analysis of (i) the one or more identified domain-dependent concepts and (ii) the one or more identified domain-independent concepts; and
classifying the given problem incident identifier by classifying one or more features derived from text of the given problem incident identifier subsequent to said parsing of said noisy and/or unstructured text from the given problem incident identifier.

17. A method, comprising:
correlating one or more items of problem incident text data from a given problem incident identifier with one or more items of event text data to generate one or more items of correlated text data within the given problem incident identifier;
applying a syntactic grammar to the one or more items of correlated text data to identify in the given problem incident identifier (i) one or more domain-dependent concepts and (ii) one or more domain-independent concepts;
parsing noisy and/or unstructured text from the given problem incident identifier based on analysis of (i) the one or more identified domain-dependent concepts and (ii) the one or more identified domain-independent concepts to derive multiple structures of the given problem incident identifier; and
categorizing the given problem incident identifier into one of a first category and a second category, wherein said first category comprises problem incident identifiers having derived structures that are contextually disjointed, wherein said second category comprises problem incident identifiers having derived structures that are not contextually disjointed, and wherein said categorizing comprises classifying one or more features derived from text of the given problem incident identifier subsequent to said parsing of said noisy and/or unstructured text.

18. The method of claim 17, wherein said categorizing the given problem incident identifier comprises implementing a linear weight-based technique to (i) score the multiple derived structures of the given problem incident identifier and (ii) assign to the given problem incident identifier the category corresponding to the highest-scored derived structure.

19. The method of claim 17, comprising:
applying a weight to each of the one or more features.

20. The method of claim 17, wherein the one or more features comprise one or more keywords and/or one or more concepts derived from text of the given problem incident identifier subsequent to said parsing.

* * * * *